Feb. 22, 1944.    H. LIEBERHERR    2,342,410
TWO-SHAFT OPPOSED PISTON INTERNAL COMBUSTION ENGINE
Filed May 27, 1942
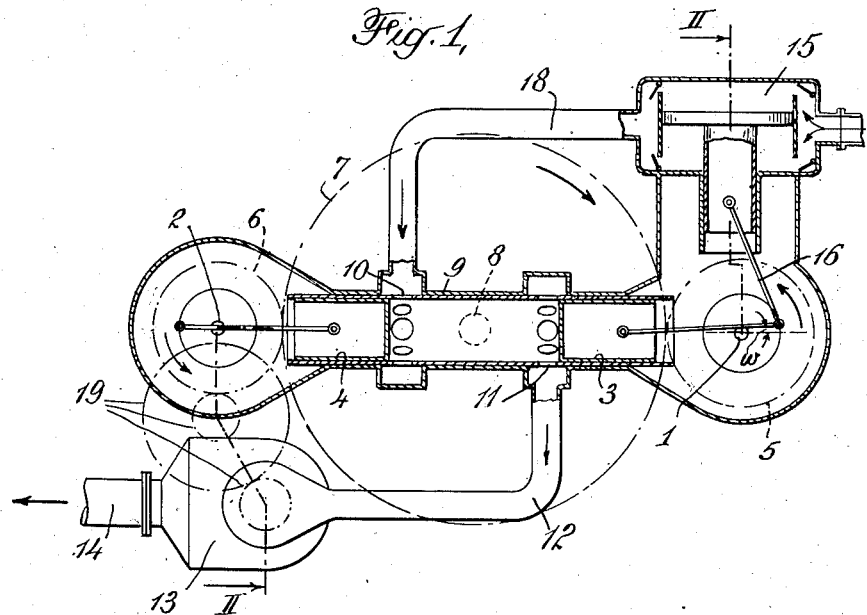
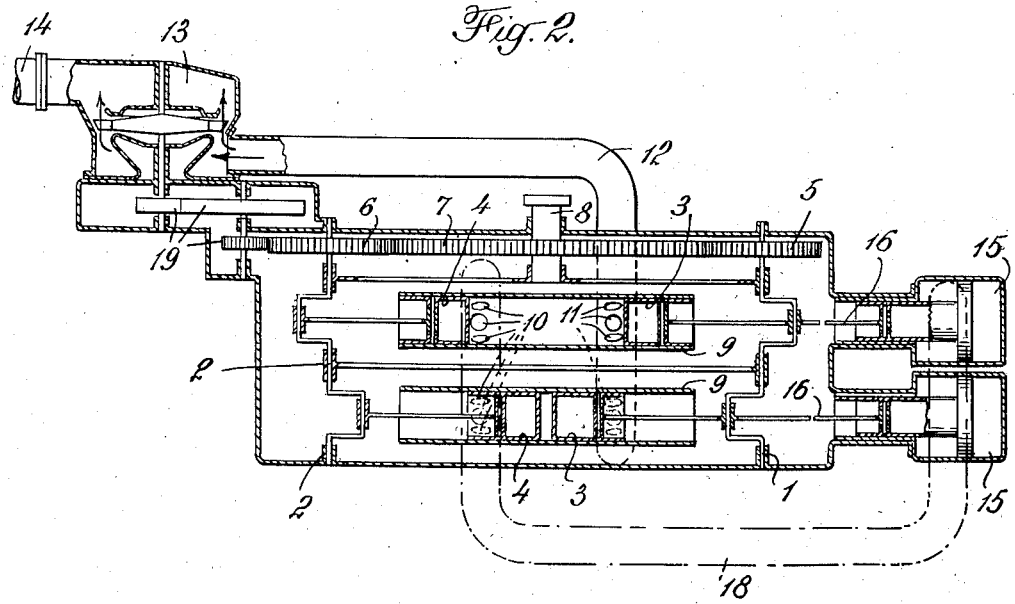
INVENTOR
HANS LIEBERHERR
BY
ATTORNEYS Patented Feb. 22, 1944

2,342,410

UNITED STATES PATENT OFFICE 2,342,410

TWO-SHAFT OPPOSED-PISTON INTERNAL COMBUSTION ENGINE

Hans Lieberherr, Winterthur, Switzerland, assignor to Sulzer Frères, Société Anonyme, Winterthur, Switzerland Application May 27, 1942, Serial No. 444,678
In Switzerland September 5, 1941

1 Claim. (Cl. 123—51)

The invention relates to a two-shaft opposed-piston internal combustion engine, working on the two-stroke cycle, the crankshaft at the exhaust side having a lead with respect to the crankshaft on the inlet side. The invention consists in that a compressor for supplying the combustion air is driven by the crankshaft on the exhaust side and a turbine driven by the exhaust gases gives its power up to the crankshaft on the inlet side.

It is preferable to construct the compressor as a reciprocating compressor, whose connecting rods are linked to the crankshaft and whose cylinders are chosen in such a way that the fluctuations in torque in the crankshaft are diminished.

One example of an execution according to the invention is shown in a simplified manner in the drawing.

Fig. 1 shows the execution in longitudinal section transverse to the crankshafts.

Fig. 2 shows a developed section along the broken line II—II of Fig. 1.

The crankshafts 1 and 2 are each driven by a group of pistons 3 and 4 respectively and transmit power through the toothed wheels 5 and 6 respectively and the central gear wheel 7 to the main shaft 8. Any kind of shaft not shown, for instance the propeller shafting of a ship, may be flanged to the main shaft.

The working cylinders 9 receive the necessary air for combustion through the inlet ports 10. The combustion gases flow from the cylinders through the outlet ports 11, then through a collecting piping 12 to the exhaust gas turbine 13, and finally from there through the pipe 14 to atmosphere or to some other point of use, for instance into a heat exchanger not shown.

The crankshaft 1 on the exhaust side of the engine has a lead with respect to the crankshaft 2 on the inlet side. When working with the sense of rotation shown in the drawing, each crank of the crankshaft 2 on the inlet side is exactly at its dead centre when the opposite crank of the crankshaft 1 on the outlet side has already passed the corresponding dead centre by the angle ω (which may be 5–10° for instance). In consequence of the lead, the power transmitted from the set of pistons 3 to the crankshaft 1 on the exhaust side is essentially greater than the power transmitted to the crankshaft 2 from the set of pistons 4 on the inlet side. The difference between the part powers transmitted may be as much as 20% of the total power of the two crankshafts or even more.

The reciprocating compressors 15 are coupled to the crankshaft 1 on the exhaust side by means of the connecting rod 16. They deliver the compressed air through pipe 18 to the inlet ports 10. The exhaust gas turbine 13 is coupled to the crankshaft 2 on the inlet side of the engine through speed reducing gear 19. The reciprocating compressors 15 reduce the power to be transmitted from the crankshaft 1 to the central gear, whilst the turbine 13 increases the power to be transmitted from the crankshaft 2 to the central gear.

Through the reduction in power that takes place on the one hand, and the increase in power on the other hand, there is a reduction in the difference between the powers which are transmitted from the two crankshafts to the main shaft through the central gear. It will therefore be possible to make the running of the engine so uniform that there will no longer be any danger of the torque, particularly of the crankshaft on the inlet side, falling so low in consequence of fluctuations at certain times that it becomes negative. Noise from the gearwheels, which might arise when neighbouring toothed flanges break contact, will thereby be avoided.

The linkage between the reciprocating compressor and the crankshaft 1 and also the moving compressor masses, are chosen in such a way that the torque at the crankshaft 1 will be still more uniform.

I claim:

A two-shaft opposed-piston internal combustion engine, working on the two-stroke cycle, which comprises at least one cylinder having two pistons operating therein, one piston being connected to each shaft, longitudinally spaced exhaust and intake ports in the cylinder, the crankshaft on the exhaust port side having a lead with respect to the crankshaft on the intake port side, a compressor for supplying the combustion air to the cylinders connected to and driven by the crankshaft on the exhaust port side, and a turbine driven by the exhaust gases operatively connected to the crankshaft on the inlet port side, whereby the said turbine aids in driving the crankshaft on the inlet port side.

HANS LIEBERHERR.